UNITED STATES PATENT OFFICE.

JAMES HIGGIN, OF MANCHESTER, ENGLAND.

IMPROVEMENT IN DYEING WITH ANILINE BLACK.

Specification forming part of Letters Patent No. 138,155, dated April 22, 1873; application filed February 12, 1873.

*To all whom it may concern:*

Be it known that I, JAMES HIGGIN, of the city of Manchester, in the county of Lancaster, England, manufacturing chemist, have invented new and useful Improvements in Making Aniline Black and in applying it to textile fabrics and yarns; and I do hereby declare that the following is a full and exact description thereof.

My improvements in producing aniline black upon textile fabrics consists in a new method of making chloride of aniline, which salt has been found the best for the production of aniline black, being either used as such in the preparation of the color or formed during the process of aging the printed goods by double decomposition. Instead of combining the aniline with an acid, as at present when making aniline black printing-color, I mix it with a solution of a metallic chloride, the base of which is not injurious to the proper oxidation of the aniline. By this means the aniline combines with the chlorine in definite proportions and chloride of aniline free from excess of acid is formed. According to the metallic chloride used the metallic base is in some cases either wholly or partially precipitated, and in other cases no precipitation takes place, a liquid being obtained containing aniline, chloride, and the metal.

I have found the sesquichlorides of iron and chromium most suitable for this purpose, and although other chlorides may be used with various degrees of success, I shall only here describe the use of these salts.

When operating with sesquichloride of iron and aniline the proportions I use are one hundred parts by measure of aniline of commerce and, according to the saturating power of the aniline, from two hundred and fifty parts to two hundred and eighty parts by measure of a solution in water of sesquichloride of iron containing iron equal to twelve grains of peroxide of iron in one hundred grains measure. When operating with sesquichloride of chromium I use the following proportions: One hundred parts by measure of aniline of commerce and from four hundred to four hundred and fifty parts by measure of a solution of sesquichloride of chromium in water marking fifty degrees on Twaddel's hydrometer. These mixtures may be used in place of the chloride of aniline of commerce in the aniline black made with sulphide of copper, using such a quantity as will contain as much aniline as in the quantity of chloride of aniline employed; but I prefer to use a compound of copper not hitherto used in making aniline black. The copper compound I employ is the disulphocyanide, which possesses the advantage of insolubility in dilute acids, and, consequently, is not dissolved by the chloride of aniline. It has further the property of not becoming oxidized in the presence of chlorate of potash until the color is printed and dried. A soluble copper salt in the color when printing is thus avoided. I make the disulphocyanide as follows: I dissolve crystallized sulphate of copper and crystallized sulphate of iron in water, in the proportions of two parts of the former and three of the latter, and add solution of sulphocyanide of potassium or other aniline sulphocyanide as long as a white precipitate falls. After allowing this to settle I pour off the clear liquid and add boiling water acidified with muriatic or sulphuric acid, and after well stirring I allow it to settle and pour off the clear liquor. This process I repeat until the precipitate has become perfectly white, when I pour it on a filter and drain until one gallon of the paste weighs sixteen pounds.

With this paste and either of the aniline preparations named above I compound aniline-black printing-colors, as follows:

Number one. Five and three-quarter pints of water and one and a quarter pounds starch; boil and add eight ounces chlorate of potash in powder; cool, and when nearly cold add thirty-three ounces measure of perchloride of iron solution, containing in one hundred grains measure iron, equal to twelve grains of peroxide of iron. When quite cold I add gradually twelve ounces measure of aniline of commerce, and when this is well mixed I add one and three-quarter ounces of disulphocyanide paste; mix well and strain through a cloth. This color is then ready for printing with. If the aniline is of average saturating power there will be no perchloride of iron in excess.

Number two. Five pints of water, one pound and a quarter of starch; beat up the starch with a little of the water, and add one and three-quarter ounces of disulphocyanide paste; add the rest of the water and boil. Add when cooling eight ounces chlorate of potash, and when nearly cold the following solution: Twelve ounces of aniline of commerce, fifty-four ounces by measure of solution of sesquichloride of chromium at fifty degrees of Twaddel's hydrometer; heat at one hundred degrees Fahrenheit until all the aniline has dissolved; mix well and strain and it is then ready for printing with. I can also make a good printing-black with the disulphocyanide paste and the ordinary chloride of aniline of commerce, in which case I proceed as follows:

Number three. One gallon of water, one and a quarter pounds of starch; beat up with a little of the water and add one and three-quarter ounces of disulphocyanide paste. When this is beaten up add the rest of the water and boil; when cooling add eight ounces of chlorate of potash, and when nearly cold sixteen ounces of chloride of aniline of commerce in crystals or cake; strain through a cloth, and the color is ready for printing.

Having described the method of carrying out my invention, I do not confine myself to the exact details herein set down, as they may be slightly varied without departing from the spirit of my invention.

I claim, as novel in the production of aniline black upon textile fabrics—

The use of the disulphocyanide of copper as an assistant oxidizer in printing color for producing aniline black.

Manchester, January 16th, 1873.

JAMES HIGGIN.

Witnesses:
   C. SEPTIMUS HUGHES,
   CHAS. WM. COLLINS.